Nov. 25, 1952     W. E. AULEN     2,619,298
WEB WINDER
Filed Oct. 20, 1950     14 Sheets-Sheet 1

INVENTOR
Walter E. Aulen.
BY
ATTORNEYS.

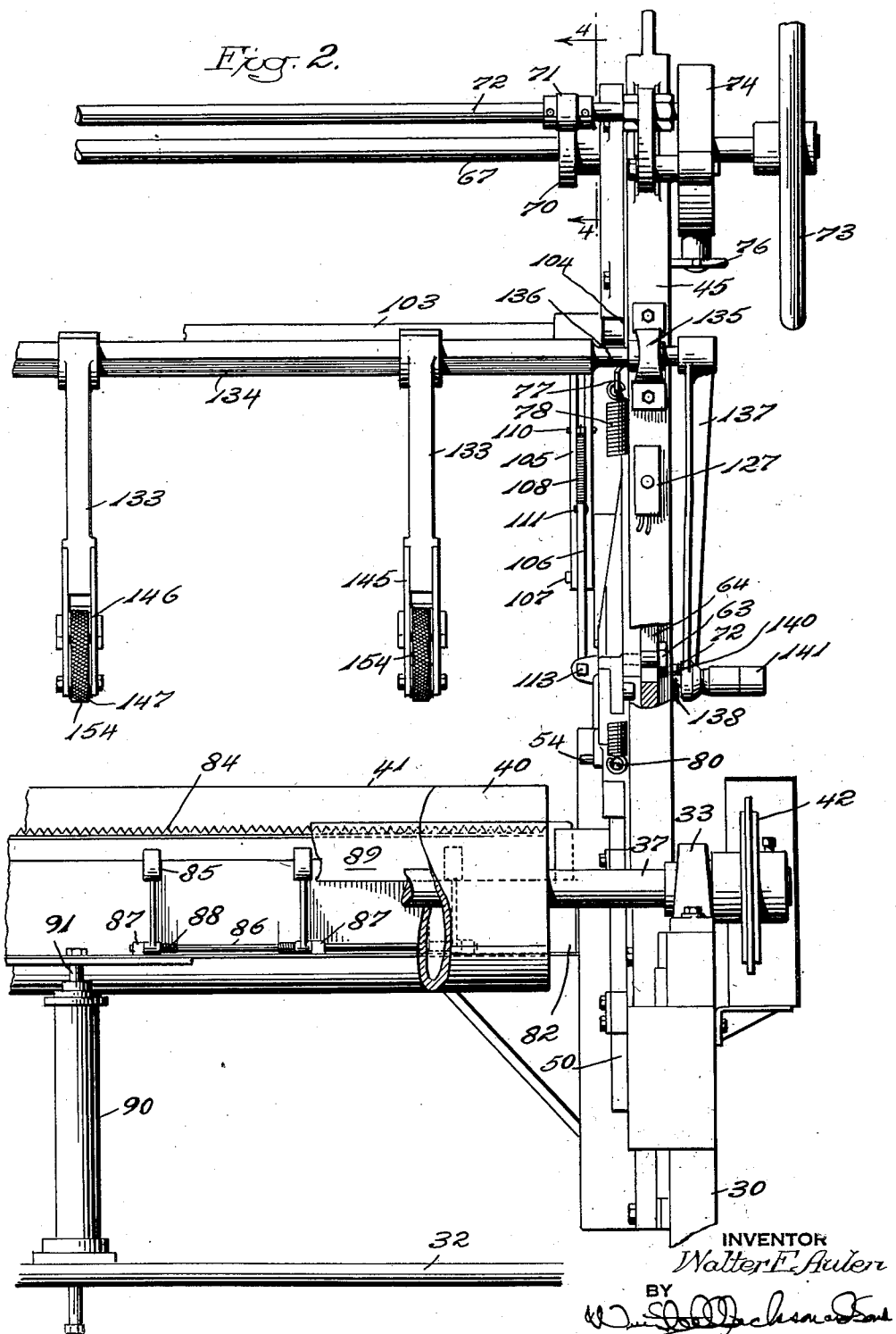

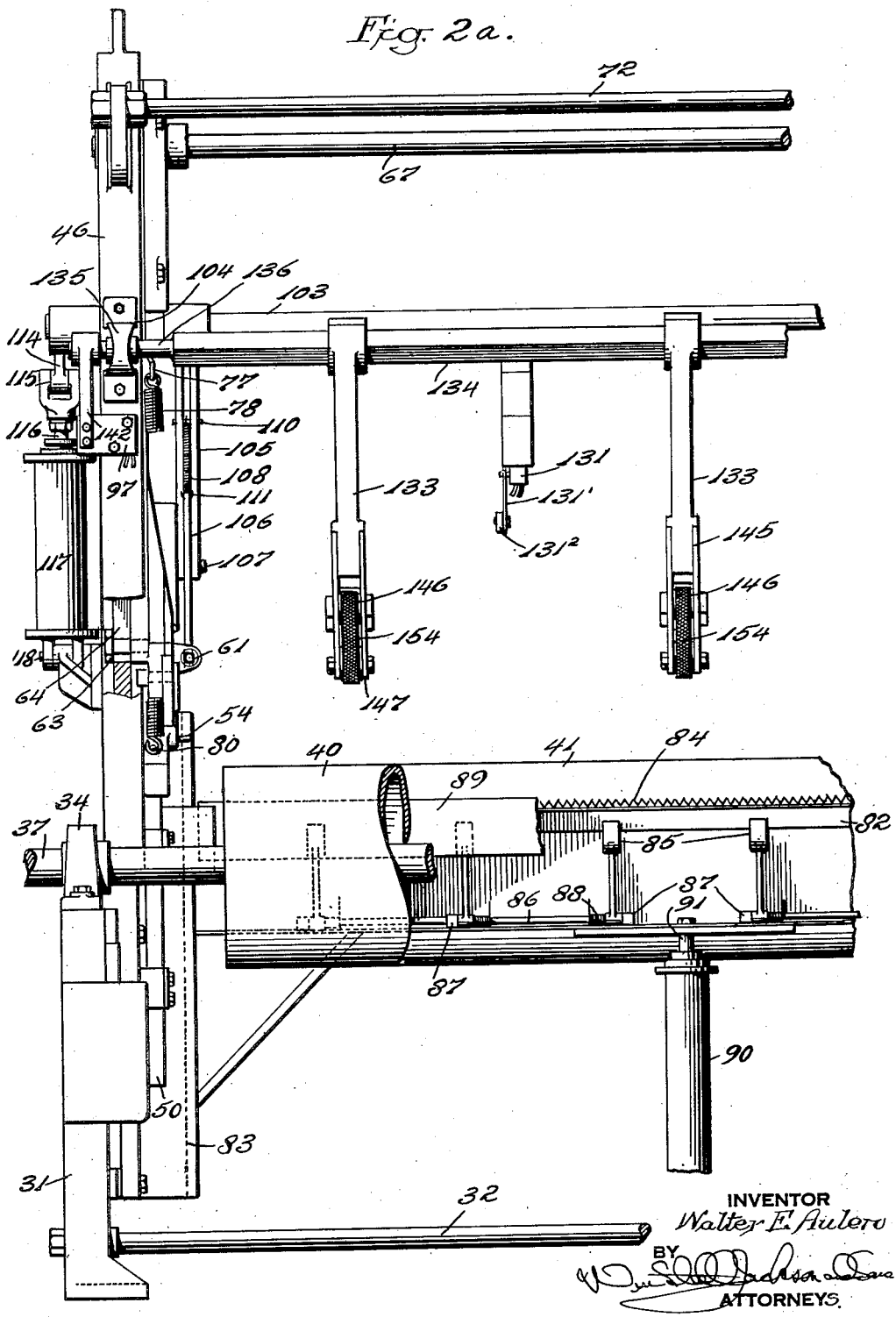

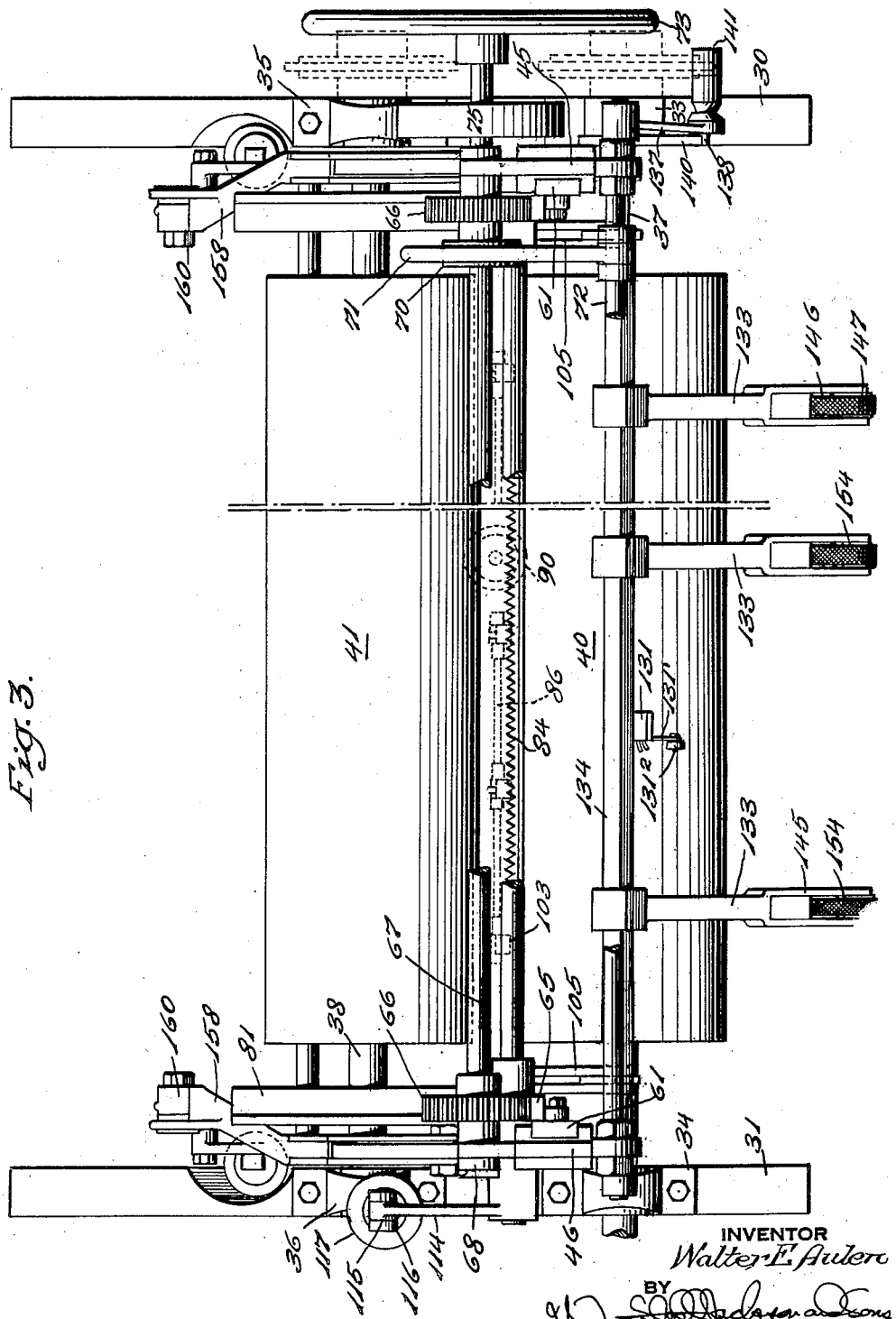

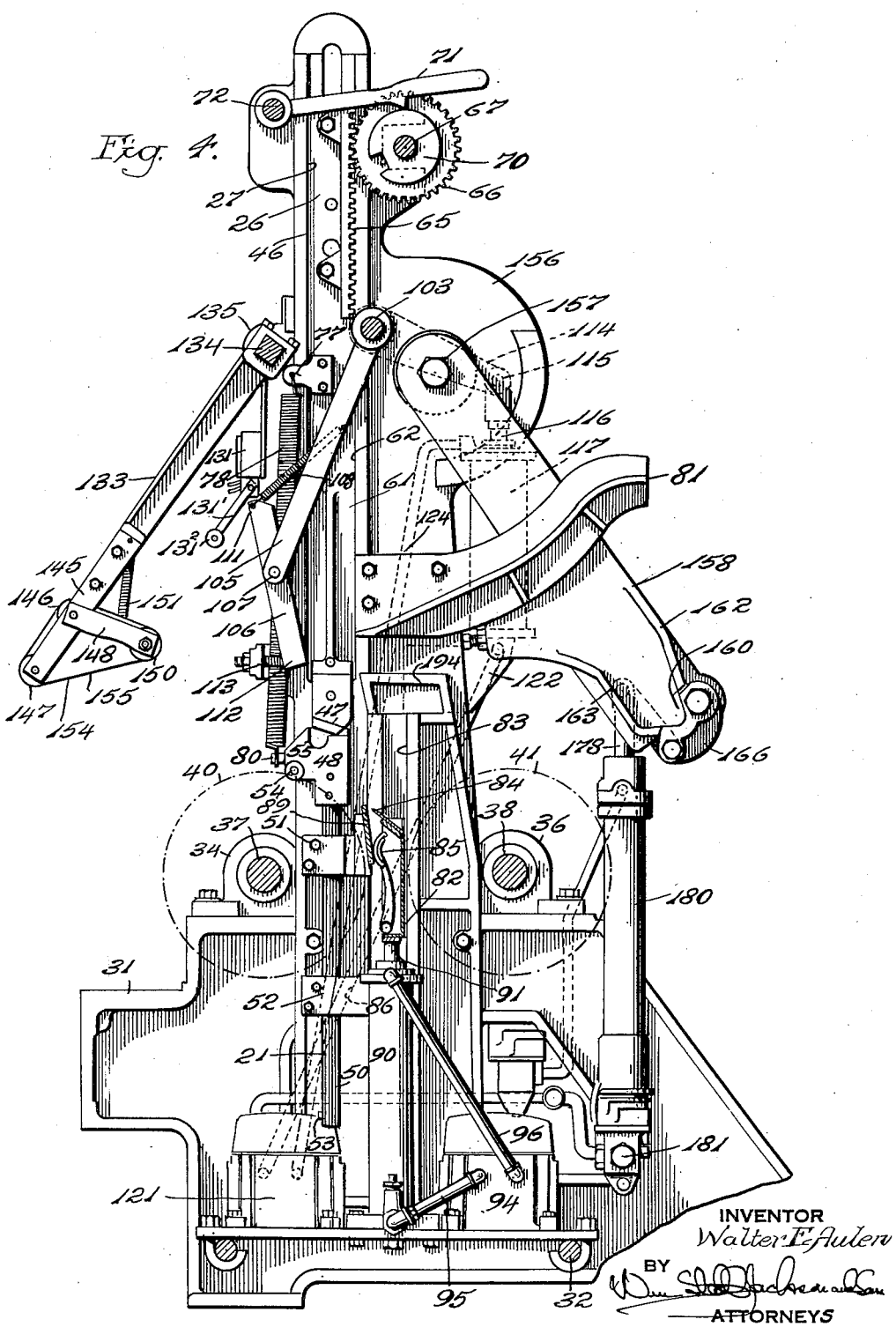

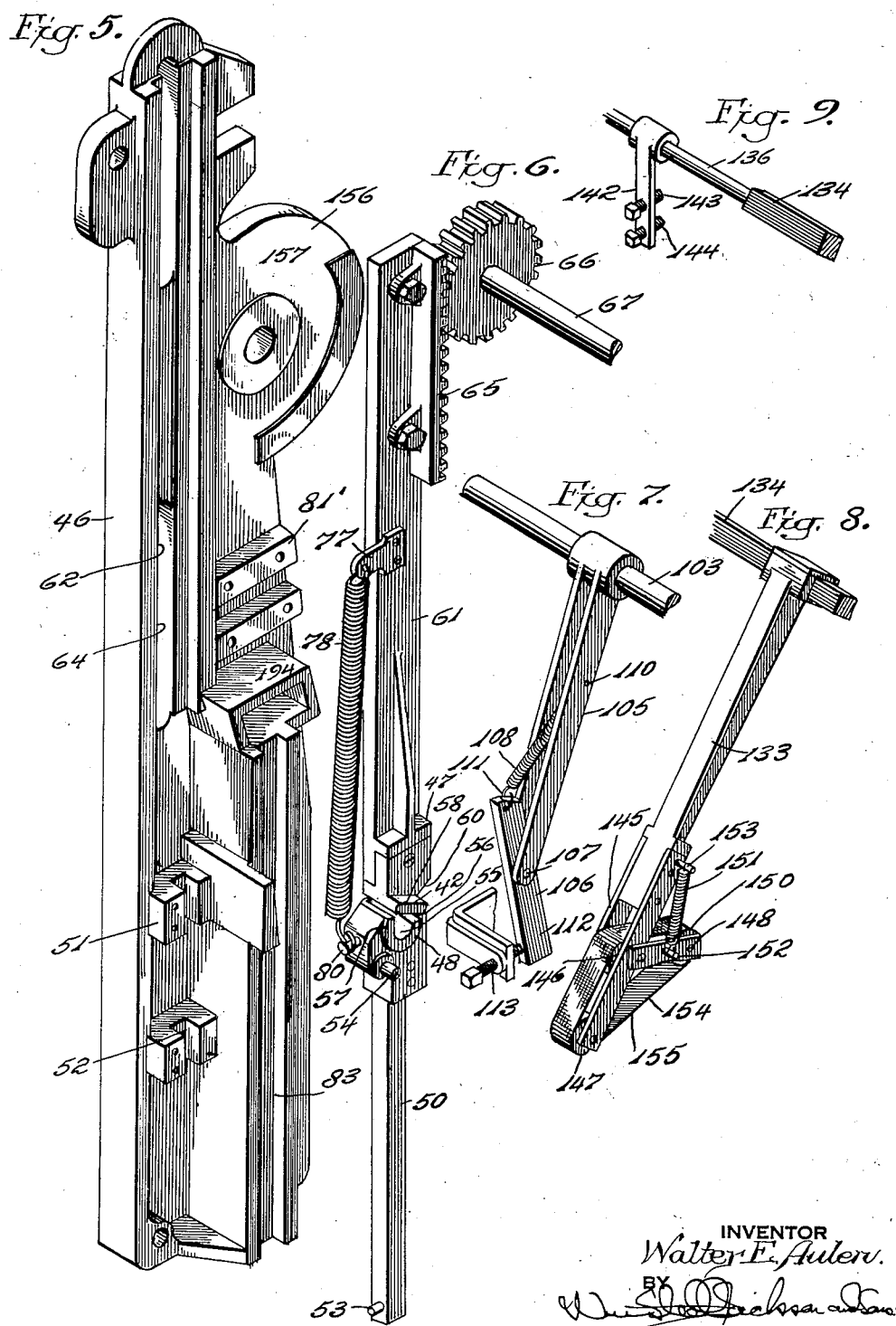

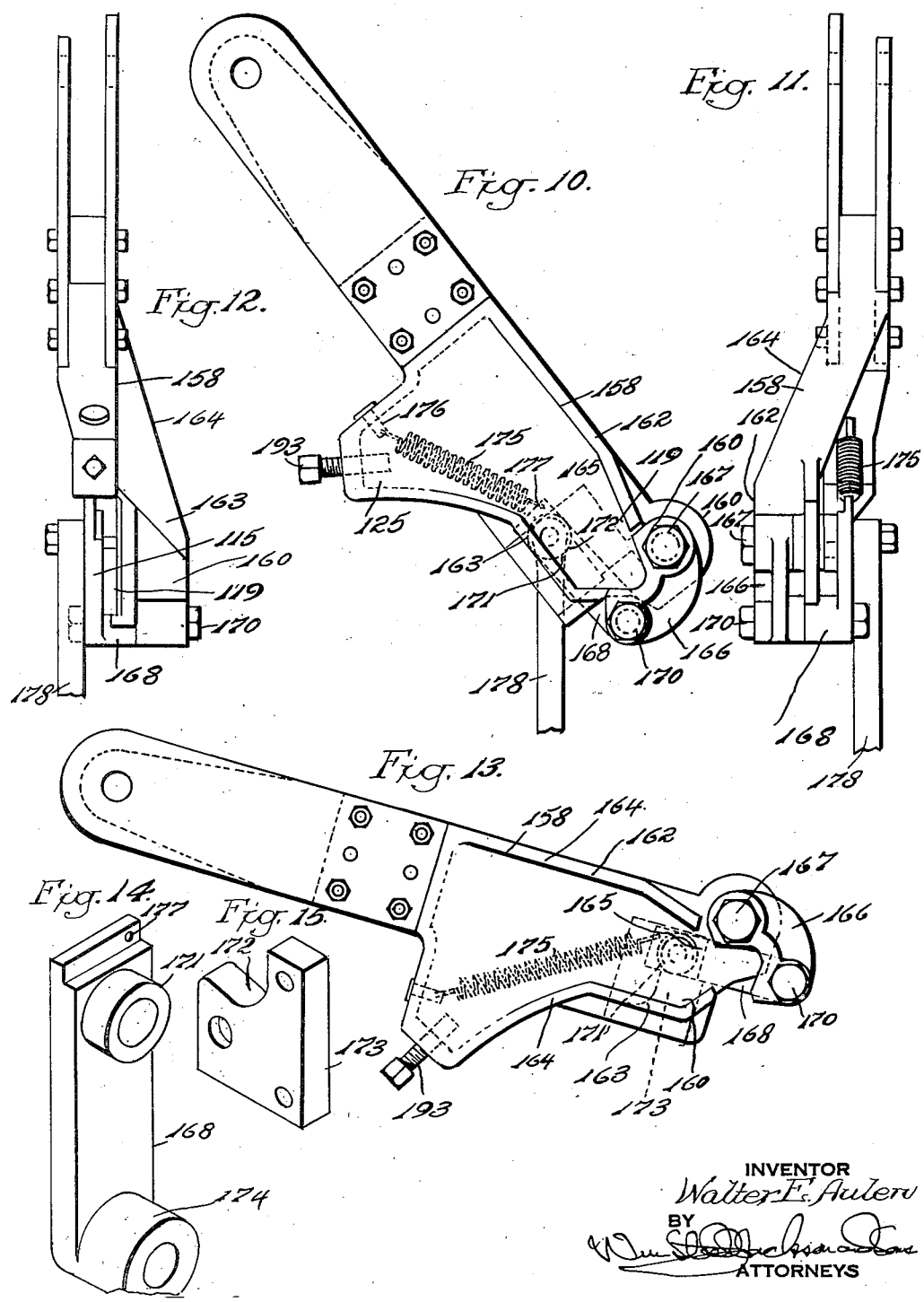

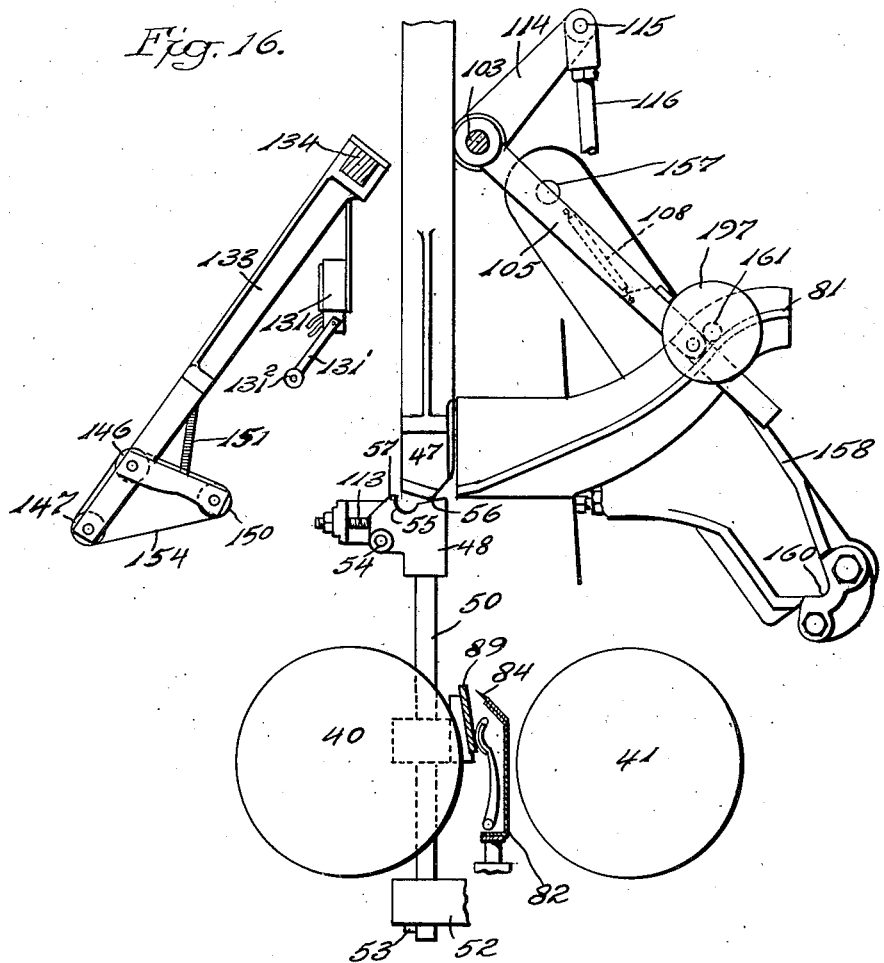

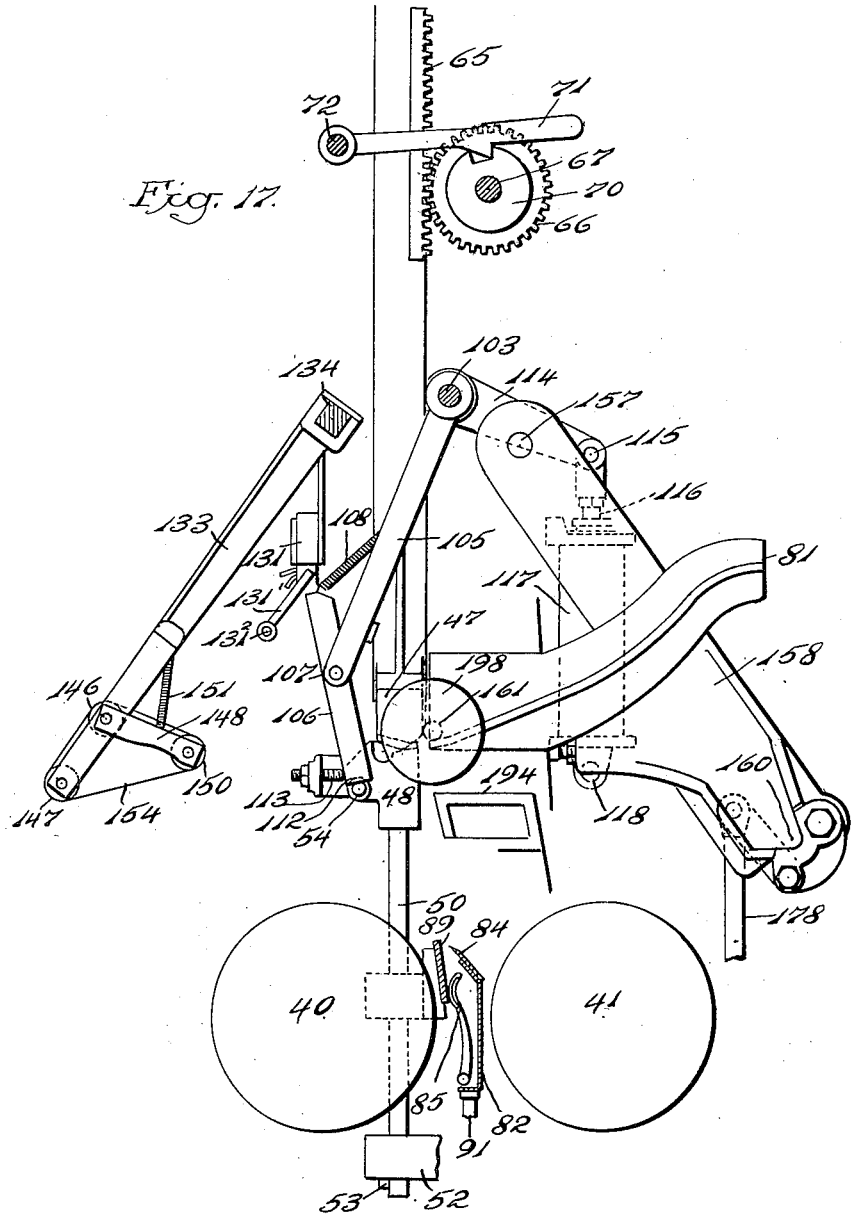

Nov. 25, 1952 W. E. AULEN 2,619,298
WEB WINDER
Filed Oct. 20, 1950 14 Sheets-Sheet 10
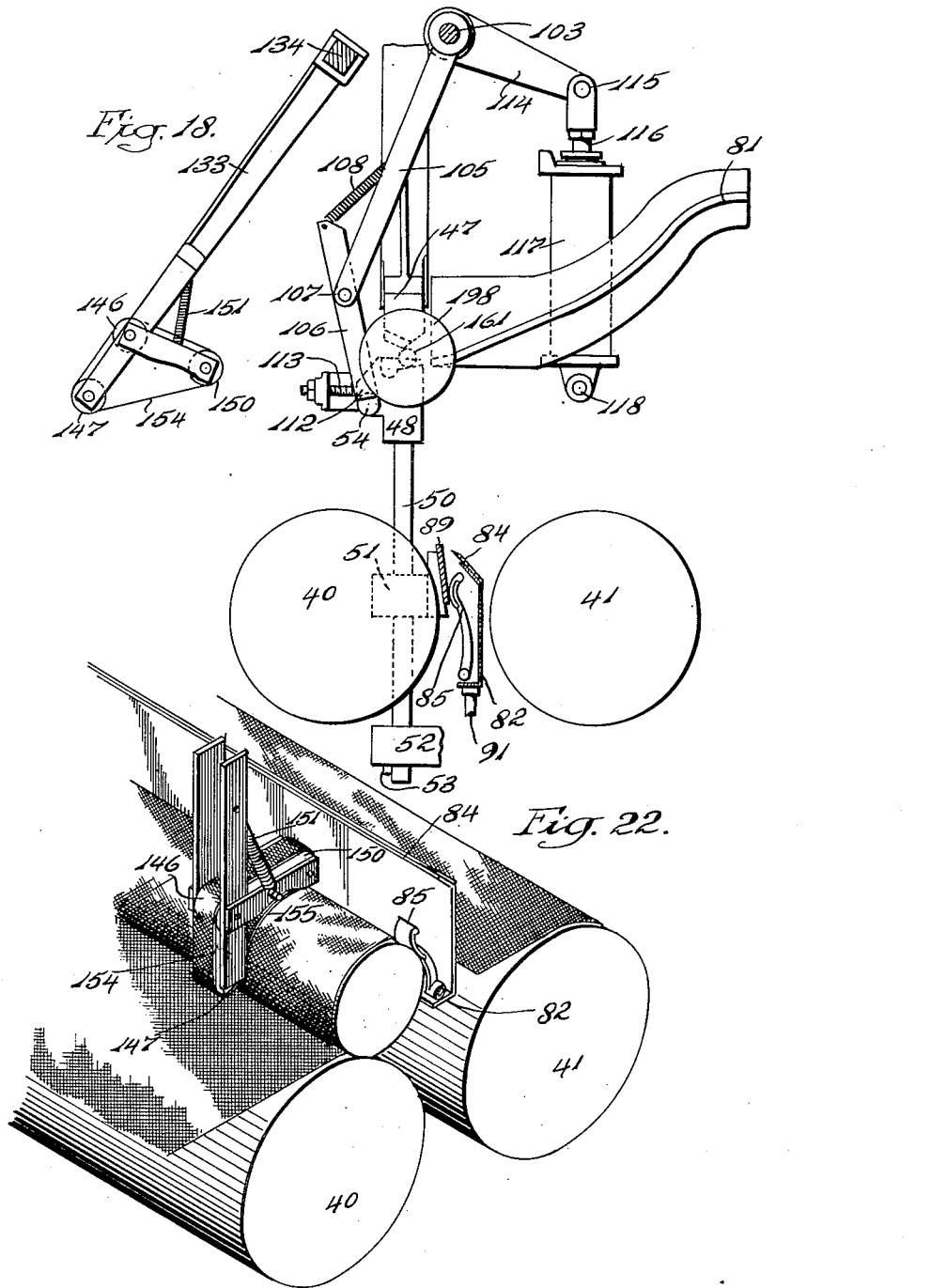
INVENTOR
Walter E. Aulen
BY
ATTORNEYS Nov. 25, 1952     W. E. AULEN     2,619,298
WEB WINDER Filed Oct. 20, 1950     14 Sheets-Sheet 11

INVENTOR
Walter E. Aulen
BY
ATTORNEYS

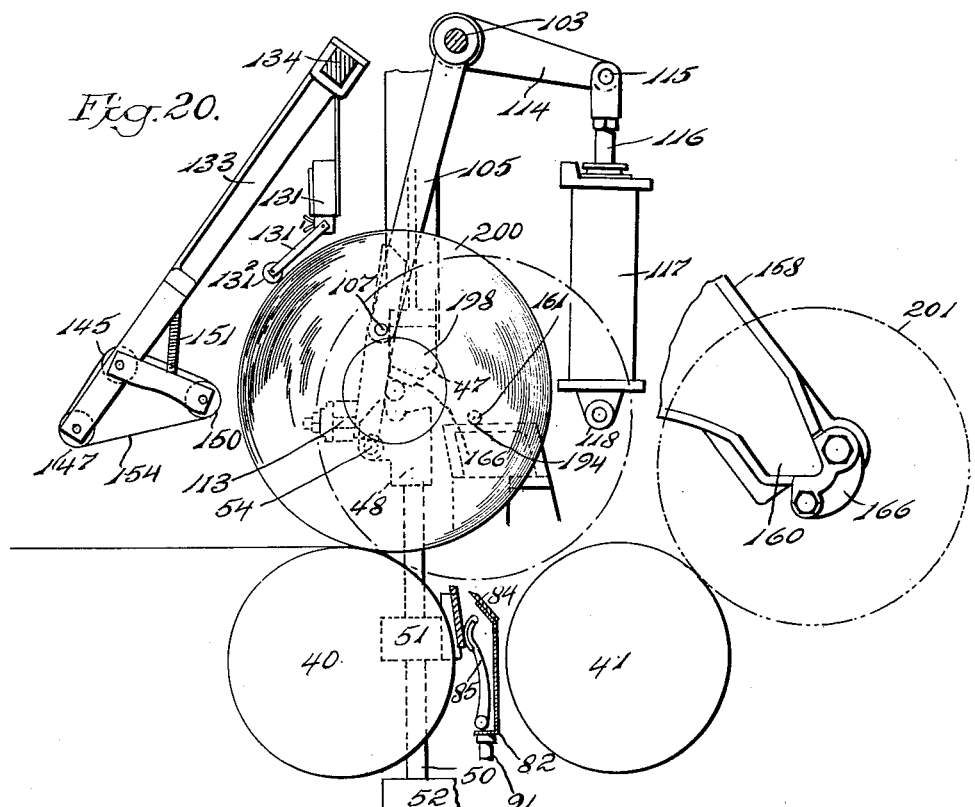
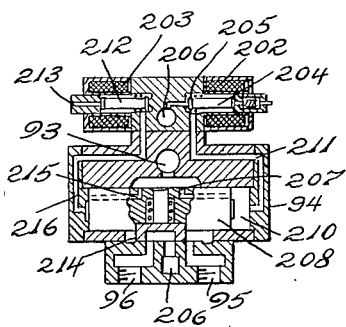
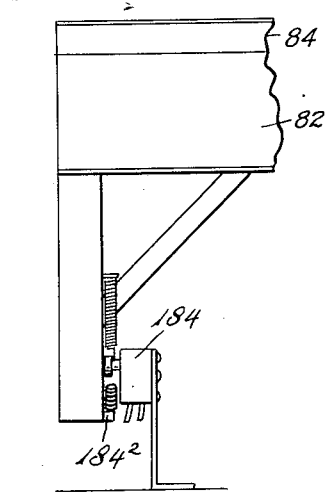
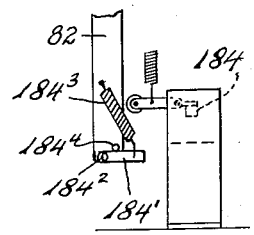

Nov. 25, 1952 — W. E. AULEN — 2,619,298
WEB WINDER
Filed Oct. 20, 1950 — 14 Sheets—Sheet 13
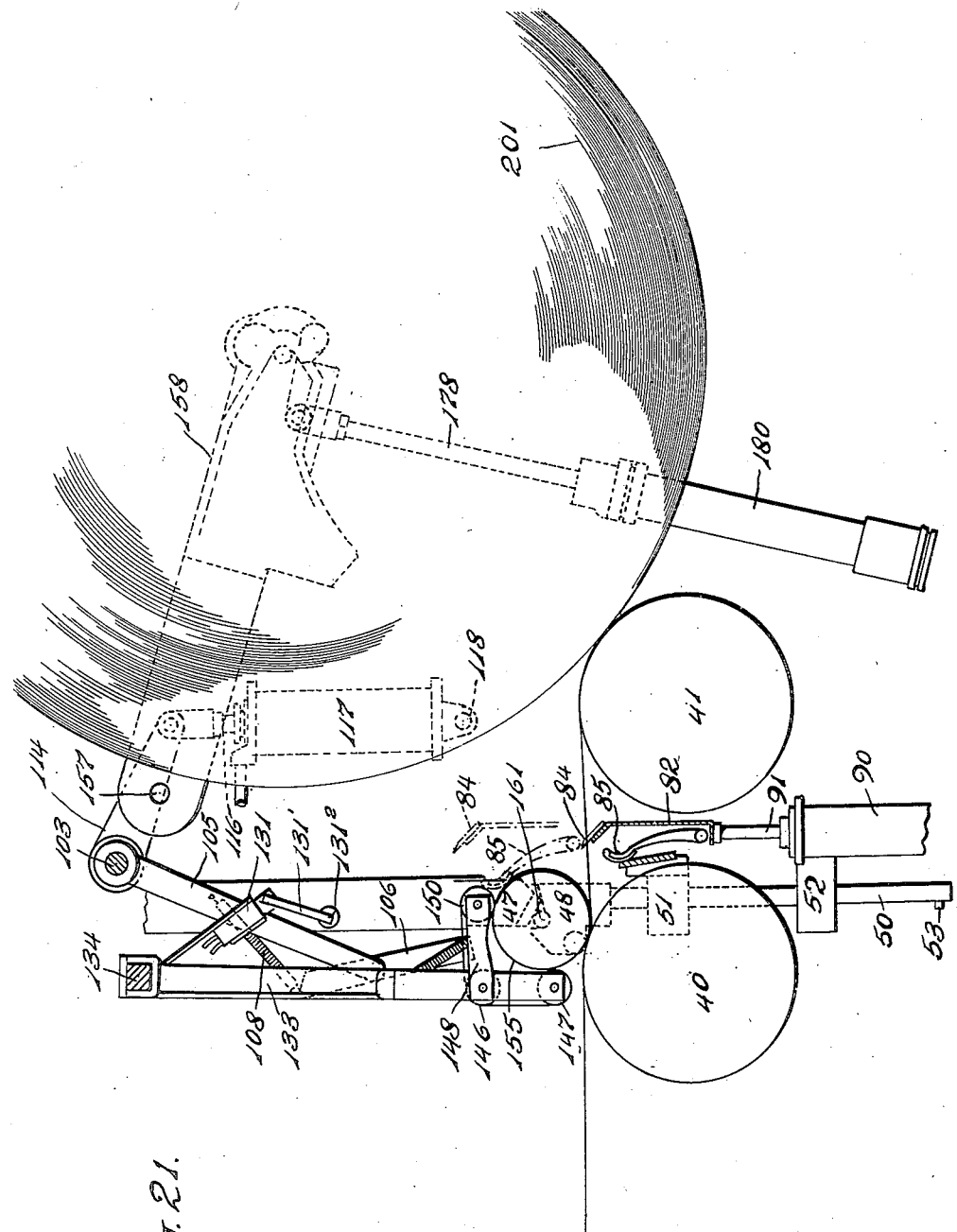
Fig. 21.
INVENTOR
Walter E. Aulen
BY
ATTORNEYS

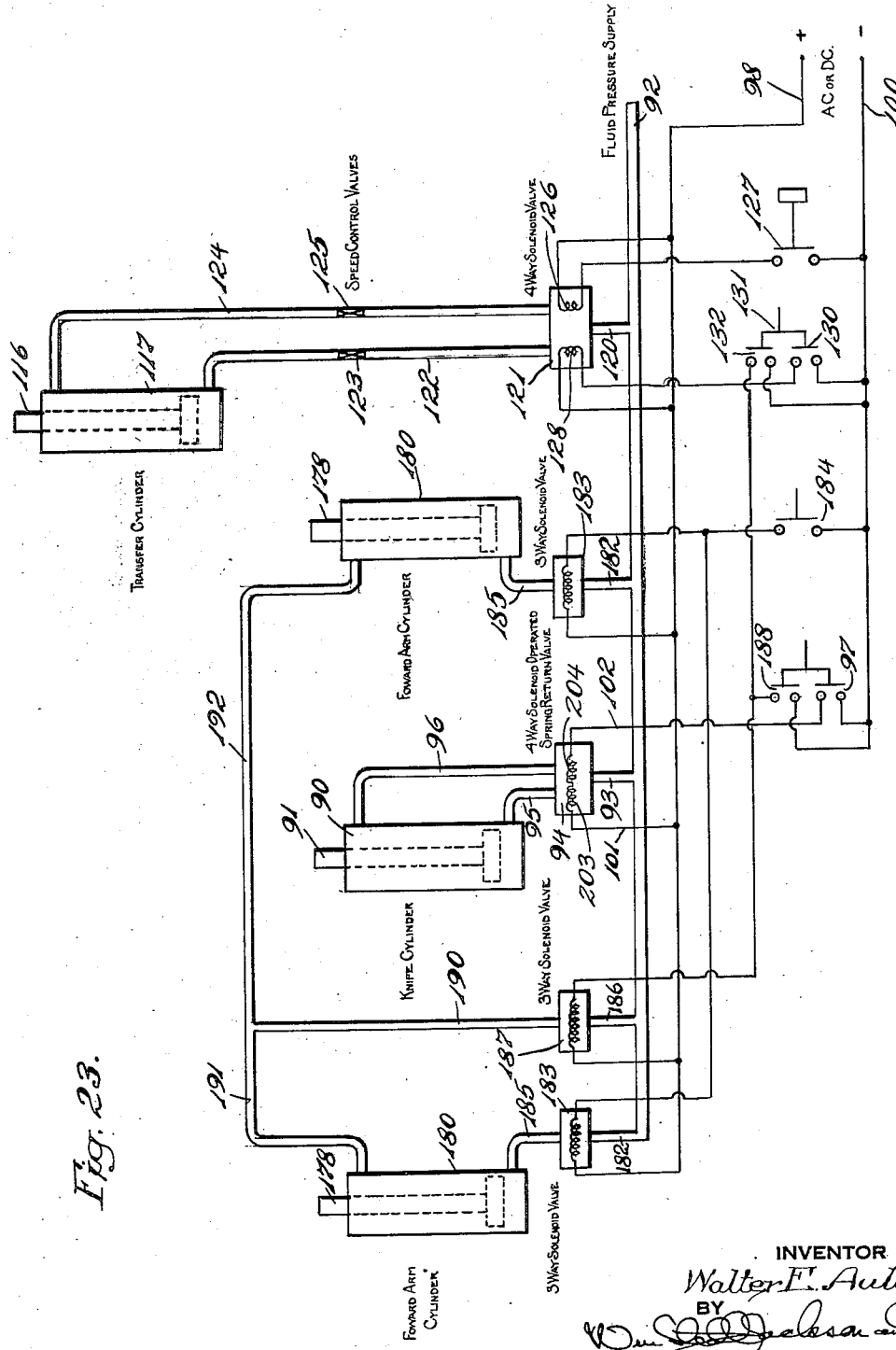

Patented Nov. 25, 1952

2,619,298

UNITED STATES PATENT OFFICE 2,619,298

WEB WINDER

Walter E. Aulen, Newark, Del., assignor to Eddystone Machinery Company, Chester, Pa., a corporation of Pennsylvania Application October 20, 1950, Serial No. 191,186

16 Claims. (Cl. 242—66)

The present invention relates to winders for webs and the like commonly referred to as cloth winders.

A purpose of the invention is to increase the safety of cloth winders, particularly by reducing the possibility that a roll may become misplaced or fall off the winder and cause injury to personnel.

A further purpose is to accomplish the transfer of a roll from the rear drum to the front drum automatically.

A further purpose is to separate the jaw bearings automatically as transfer of a roll is made from the rear drum to the front drum.

A further purpose is to accomplish transfer of a roll from the rear drum to the front drum at a predetermined diameter of the roll, thus avoiding the possibility that the roll may be wound too far on the rear drum and be very difficult to transfer.

A further purpose is to separate the transfer arms from the threading arms and permit the transfer arms to act independently of the threading arms, both from the standpoint of latching a new shell on the loading tracks and also from the standpoint of moving a partially wound roll to the forward drum.

A further purpose is to employ a toggle action to release the lower jaw bearings as the transfer arms move forward, the toggles being held in broken position by abutments in the rear position of the transfer arms.

A further purpose is to pull the forward arms down automatically as the transfer arms are carried forward automatically.

A further purpose is to load a new shell on loading tracks and latch it in position by transfer arms, to swing the transfer arms rearwardly and bring the new shell in position to enter the jaw bearings, to open the jaw bearings to receive the new shell, to move the threading arms and threaders forward to contact the new shell and thereby close a switch to apply fluid pressure to the top of the forward arm cylinders to pull down on the front roll, and thereby close a switch to actuate the knife, then preferably by motion of the knife to cause the forward arm cylinders to raise and release the forward roll, later when the shell on the back drum is wound to a predetermined size to actuate a switch which causes fluid pressure to be applied to the forward arm cylinders to pull the forward arms down, and which causes the transfer arms to move forward, thereby applying a downward push to the lower jaw bearings to separate the jaw bearings, and carrying the rear roll forward to the front drum.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

Figure 1 is a left side elevation of the web winder of the invention.

Figures 2 and 2ᵃ are partial rear elevations of the web winder of the invention, Figure 2 showing the right end and Figure 2ᵃ the left end as viewed from the rear. Structure toward the middle is broken away, as well as structure at the extreme left in Figure 2ᵃ.

Figure 3 is a broken plan of the web winder of the invention.

Figure 4 is a broken sectional elevation of my web winder, the section being taken on the line 4—4 of Figure 2.

Figure 5 is a perspective view from the inside of one of the secondary frames.

Figure 6 is a detached fragmentary perspective of the shell jaw bearings.

Figure 7 is a detached fragmentary perspective of one of the transfer arms, the transfer shaft and the transfer abutment.

Figure 8 is a perspective of the threading shaft, one of the threading arms and one of the threaders.

Figure 9 is a fragmentary perspective of the knife switch operating arm.

Figure 10 is an inside elevation of one of the forward arms and forward jaw pivots, with the actuating rod broken away.

Figure 11 is a front elevation of Figure 10.

Figure 12 is a rear elevation of Figure 10.

Figure 13 is a view corresponding to Figure 10 with the forward arm raised into jaw opening position.

Figure 14 is an enlarged fragmentary perspective of the operating lever shown in Figures 10 to 13.

Figure 15 is a detail perspective of the locking cam of Figures 10 to 13.

Figure 1:
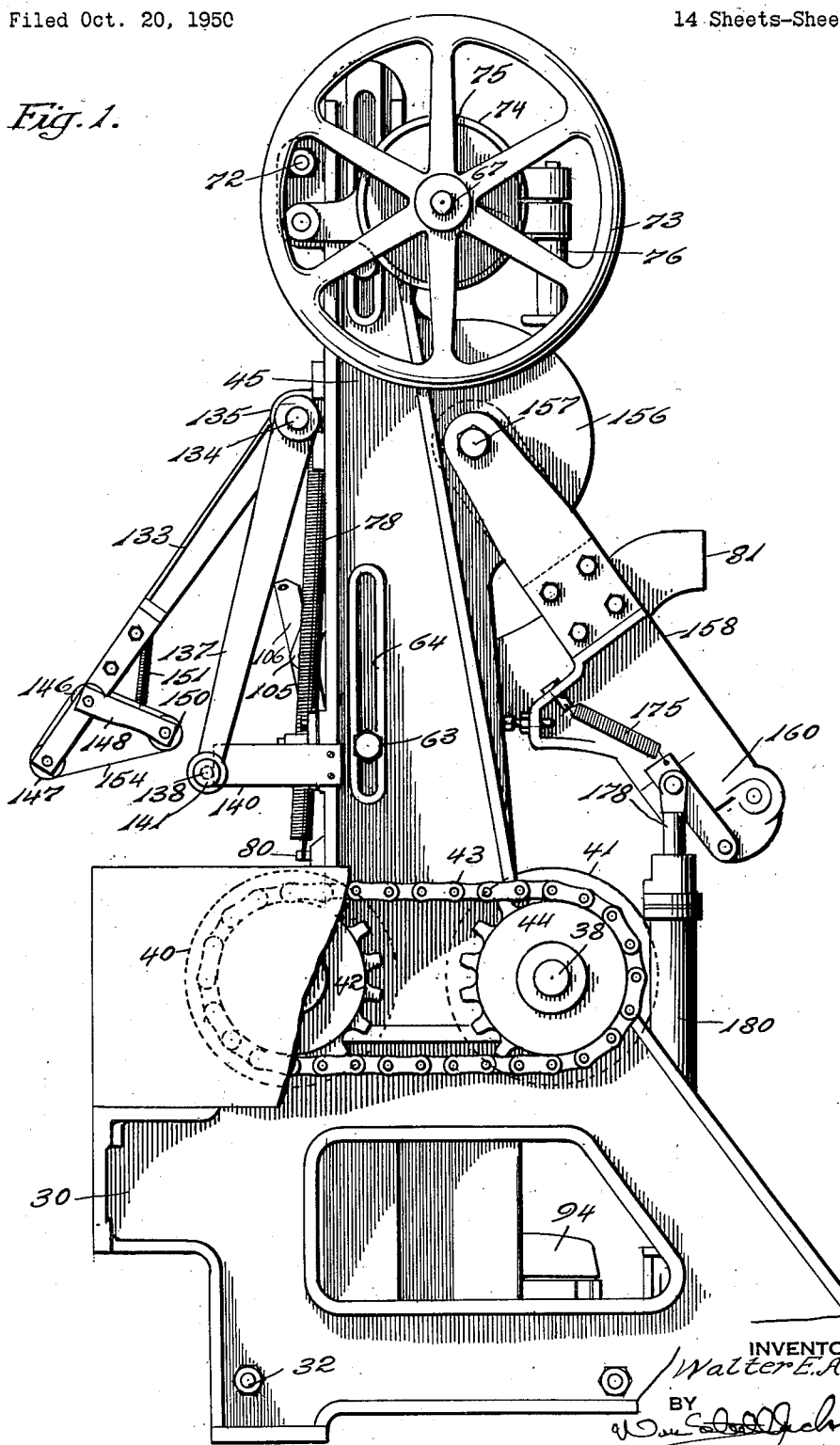

Figures 16 to 21 inclusive are diagrammatic views of the operating parts showing the progressive steps of operation, starting with the loading of a new shell, the starting of web on this shell, the transfer of the partially wound roll, the cutting of the web and the unloading of the wound roll.

Figure 22 is a fragmentary perspective of the knife, threading fingers and threader.

Figure 23 is a schematic view of the fluid operating circuit and the electrical circuit.

Figure 24 is a sectional diagram of a knife valve which may be used in the invention.

Figure 25 is a fragmentary enlarged side elevation of the gate and associated switch.

Figure 26 is a fragmentary end elevation of Figure 25.

Describing in illustration but not in limitation and referring to the drawings:

In recent years so-called cloth winders or web winders have been applied not only to numerous types of cloth but also to plastic sheets, coated fabrics and the like. The sizes of the rolls wound both in width and diameter have tended to increase and many of the rolls now employed are so large and heavy that, if any unforeseen motion of the roll occurs, they may constitute a danger not only to personnel operating the winder but to others in the neighborhood, creating an industrial hazard. One of the important purposes of the present invention as set forth above is to provide better control throughout of the manipulation of the roll at all stages, so as to minimize the possibility that the roll might get out of control on the machine or unexpectedly fall off the machine. It is further desired to reduce the possibility that the strength required to manipulate the roll on the machine would be beyond that possessed by a normal worker.

Accordingly by the present invention, the forces required to transfer the roll from the rear drum to the front drum are applied automatically and mechanically. Furthermore the forward jaws are brought down mechanically to protect against the possibility that they might not be in proper position to receive the roll when it reaches the front drum. Since the transfer is automatic in response to the build up of a predetermined diameter of roll on the rear drum, there is no possibility that the roll may be wound too large before transfer is effected.

Not only is the transfer itself accomplished automatically, but the release of the jaw bearings is brought about automatically in connection with the transfer.

The transfer arms not only function as means to move the roll forwardly, but they also latch the new shell on the loading track against premature rearward motion.

In accordance with the present invention the transfer arms are separated from the threading arms and function independently. The threading arms control the switch actuation of the knife, and also control the switch application of the holddown pressure by the forward arms.

The switch mechanism which actuates in response to the attainment of a predetermined diameter on the roll on the back shell, actuates mechanism to pull the forward arms down, and forces the transfer arms forward, opening the jaw bearings and carrying the roll to the front drum.

In accordance with the invention, frames 30 and 31 interconnected by braces 32 support bearings 33, 34, 35 and 36, which respectively support suitably parallel horizontal shafts 37 and 38 respectively carrying the rear drum 40 and the front drum 41 as well known. The shaft 37 is driven from an electric motor or the like through a suitable speed reduction, not shown, and has secured thereto at the opposite end a sprocket 42 which is intergeared by a chain 43 with a sprocket 44 on the corresponding end of shaft 38 of the other drum. Thus the two drums turn together in the same direction and at the same peripheral speed, since they are of the same diameter and the sprockets are of the same size.

Secondary frames 45 and 46 extend upwardly from the frames at the two ends as well known, and carry suitably integrally therewith guideways for the upper and lower jaw bearings 47 and 48, best seen in Figures 4, 6 and 16 to 21 inclusive.

The lower jaw bearing 48 has a squared shank 50 (Figures 4 and 6 and 16 to 21) extending below it, which slides in guide bearings 51 and 52 (Figures 4, 5 and 16 to 21) on the auxiliary frames. At the lower end of the squared shank 50, a stop pin 53 extends out and in upward limiting position the stop pin engages lower guide bearing 52 and prevents further upward movement of the lower jaw bearing. The lower jaw bearing has a cam projection 54 which is engaged by a pusher on one of the transfer arms during forward motion as later explained. The upper portion of the lower jaw bearing forms a socket recess 55 (Figure 6) which receives the pivot in the end of the rear shell as later explained. Forwardly of the socket the upper face of the lower jaw bearing has a slightly tapering forwardly extending portion 56 and rearwardly the lower jaw bearing has a comparatively high rim 57.

The upper jaw bearing 47 has a downwardly directed face 58 (Figure 6) which closes the top of the socket and is relatively low at the forward edge and higher at the rearward edge, with an upwardly tapering approach surface 60 at the front. The upper jaw bearing is mounted on the lower end of a slide 61 which moves up and down in guideways 62 (Figures 4, 5 and 6). Each slide 61 is held in place by a bolt 63 moving in a slot 64 of the corresponding auxiliary frame (Figures 1, 2, 2ᵃ and 5). The slide 61 has secured at its upper end a rack 65 (best seen in Figures 6, 17 and 19) which meshes with a gear 66 on a shaft 67 supported in bearings 68 fastened to the auxiliary frames. The shaft 67 has fastened thereon a ratchet wheel 70 which is engaged by a pawl 71 pivotally mounted on a girt rod 72 extending across between the auxiliary frames. The pawl allows the jaw bearings to separate but holds the shaft 67 against rotation which would bring the upper jaw bearing down and thereby holds the upper jaw bearing in its raised position until such time as it is desired to lower the upper jaw bearing into contact with the lower jaw bearing at the time that a new shell is brought to position on the lower drum for starting a new roll. The raising and lowering of the upper jaw bearing is controlled by hand wheel 73 on shaft 67 under the control of the operator.

The tendency of the upper jaw bearing to move upwardly as the roll winds on the rear drum is retarded by brake band 74 which engages brake drum 75 (Figure 1) on shaft 67 as well known in the art. The brake band is tightened as well known by an adjustable tightening screw mechanism 76, which thus regulates the density of winding of the web.

The slide 61 for the upper jaw bearing has a spring abutment 77 which engages one end of tension spring 78. The opposite end of tension spring 78 is engaged on spring abutment 80 extending from the side of lower jaw bearing 48. Spring 78 tends to pull the two jaw bearings of each set toward one another, and keeps them in contact except at such times as the lower jaw bearings are pushed down by the toggle levers 106 on the transfer arms 105 when transferring the roll from the rear to the front drum, or when the handwheel is turned to raise the upper jaw bearings to allow the shell pivots to drop in the lower jaw bearings.

Loading tracks 81 (mounted on pads 81', Figure 5) are positioned on opposite sides of the auxiliary frames, and extend rearwardly and downwardly from positions well above the front drum to positions cooperating with the jaw bearings when they are in raised position as later explained. As well known in the art, a gate 82 is supported in vertical moving relation in guides 83 on the auxiliary frames (best seen in Figures 4 and 5), the gate carrying a suitable serrated rearwardly directed knife 84 at the top edge as well known. The knife extends clear across the length of the drums and is located between the front and rear drums.

Supported on the gate and directed rearwardly below the knife are tucking fingers 85 (Figures 2, 2a and 22) pivotally mounted on transverse shaft sections 86 journalled in bearings 87 on the gate and urged rearwardly by spiral springs 88 extending around the shafts and engaging the tucking fingers at one end and the side of the gate at the other end. The spiral springs cause the tucking fingers to exert pressure against the severed end of the web so that the web follows the contour of the new shell until it reaches and passes under the ends of the threaders as later described. When the gate is down the tucking fingers are held against the gate by depressor wall 89.

The knife is raised by fluid cylinder 90 having a double acting piston and rod 91 (best seen in Figures 2, 2a and 23) which connects to the gate near the middle. The lower end of the cylinder is connected to a source of fluid pressure 92 (suitably compressed air) by a pipe 93 through a four-way solenoid actuated, spring return valve 94, which connects fluid through pipe 95 to the bottom of cylinder 90 (see Figures 4 and 23) and by pipe 96 to the top of cylinder 90. A four-way solenoid operated spring return valve is of well known character, which when energized to open fluid connection 95 to the bottom of the cylinder 90 connects pipe 96 at the top to exhaust, and when de-energized immediately reverses by connecting the bottom of the cylinder by pipe 95 to exhaust and the top to fluid pressure, thus automatically effecting lowering of the knife.

When the threading belts 154 are moved forward in contact with the roll on the rear drum, switch 97 is closed, connecting power leads 98 and 100 to the solenoids of valve 91 through circuit branch connections 101 and 102 (Figure 23), and this energizes solenoids 202 and 203 (Figure 24). Solenoid armature 204 moves to the right against its spring and opens valve 205 to exhaust 206, which discharges fluid pressure admitted at 93 through passage 207 of valve piston 208 to the cylinder 210 and out passage 211 and valve 205. At the same time solenoid 203 is energized and moves armature 212 against its spring to close open exhaust orifice 213. High pressure fluid then enters cylinder 214 from passage 215 and cannot flow freely through passage 216 because orifice 213 is closed, and the valve piston 208 is forced to the right, admitting fluid pressure to connection 95 to raise the gate. When the valve piston moves to the right it closes passage 211, and cylinder 210 is again filled with high pressure fluid.

When the operator pulls the threaders back away from the rear shell after the cut, switch 97 is de-energized and this de-energizes solenoids 202 and 203 so that their armatures spring return and the valve piston reverses to the position shown in Figure 24, connecting connection 95 to exhaust 206, and connecting connection 96 to fluid pressure to lower the gate.

The auxiliary frames 45 and 46 support thereon a shaft 103 above the drums which journals in bearings 104 near the ends. The shaft 103 supports at intervals and preferably near the ends transfer arms 105 (best seen in Figure 7). The transfer arms are preferably arranged in pairs of spaced arms, and pivotally support near the outer end of each set of transfer arms the toggle lever or pusher 106 which swings about a pivot 107 intermediate between the ends of the toggle lever. A tension spring 108 urges the toggle lever to its position in prolongation of the transfer arm and is connected between the upper portion of the transfer arm at 110 and the upper end of the toggle lever at 111. The lower end 112 of each toggle lever 106 contacts an adjustable screw stop abutment 113 on an auxiliary frame in the rearward position of the transfer arm, breaking the toggle as best seen in Figures 4 and 7 so that the lower portion of the toggle lever extends forwardly and downwardly with respect to the transfer arm in this position. During the forward movement of the transfer arm this lower end 112 of the toggle lever engages the lower jaw bearing abutment 54 when the lower jaw bearing has moved to its upper position, releasing the jaw bearings from the pivot ends of the shell as shown in Figure 20.

At one end of the shaft 103, crank arm 114 (Figures 2a, 3, 4) extends out from the shaft secured to the shaft, and at the remote end the crank arm pivotally connects at 115 with double acting piston and rod combination 116 in transfer cylinder 117 pivotally supported on one of the auxiliary frames at 118 at the bottom of the cylinder. The transfer cylinder is supplied with fluid, suitably compressed air, from branch pipe 120 (Figure 23) connected to the main fluid supply through four-way solenoid valve 121 of well known character. Pipe 122 connects to the bottom of cylinder 117 through speed control valve 123 and pipe 124 connects to the top of cylinder 117 through speed control valve 125. The speed control valves are adjustable to cause suitable reduction in the effective cross section of the pipe and thereby adjust the speed. Solenoid valve 121 has a solenoid 126 connected in series with switch 127 between the main line connections 98 and 100. Switch 127 is suitably a push button switch as shown in Figure 2. Solenoid 128 is connected in series with switch 130 across the line connections 98 and 100. Switch 130 is part of a multiple switch 131 having a wholly independent set of contacts 132 later described, which are closed at the same time that the contacts 130 are closed. Switch 131 is suitably supported by threading shaft 134 and is closed by feeler lever 131' when the roll reaches a predetermined size on the rear drum (Figures 2a, 3, 4, 16, 17, 19, 20 and 21). The feeler arm carries roller 131². The proper end of the cylinder 117 automatically exhausts as well known when the valve which admits air or other fluid to that end is closed.

Threading arms 133 are supported on a suitably squared shaft 134 which is rotatably supported in bearings 135 on the auxiliary frames which receive rounded ends 136 on the ends of the shaft. At one end of the shaft, an operating lever 137 is connected thereto and carries a spring urged pin 138 at its lower end (Figures 2 and 3) which rests forwardly against an abutment 140 in retracted position of the threading arms 133.

A handle 141 connected to the pin 138 permits withdrawal of the pin from contact with the abutment and forward movement of the threading arms when desired.

At the opposite end of the shaft 134 from that having the operating lever 137, a switch operating lever 142 is mounted (Figures 2ª and 9) which has two adjustable forwardly directed screws 143 and 144. On forward motion of the threading arms, adjustable screw 143 engages and closes switch 97 (Figures 2ª, 9, 23) and screw 144 engages the switch housing after the switch closes, preventing overtravel which might damage the switch. When switch 97 closes it actuates the knife cylinders as already explained.

The threading arms 133 at their outer ends carry threading belts 154 as described in detail in my application Serial No. 168,948, filed June 19, 1950, for Web Winder, and as best seen in Figure 8. Fork extensions 145 on the threading arms pivotally support fixed rotatable rollers 146 and 147. Swinging arms 148 pivoting on the fork ends 145 suitably at the pivot of roller 146 extend outwardly and at their remote ends pivotally support movable rotatable roller 150. The arms 148 are urged toward the upper ends of the threading arms by tension spring 151 extending from an abutment 152 on arms 148 to an abutment 153 on the transfer arm. Belt 154 is threaded around the rollers 146, 147 and 150 and has a bight 155 which can yield by pulling against the spring 151 to surround the rear upper portion of the circumference of the new shell when the transfer arms are moved forwardly. Thus when the lower forwardly directed surfaces of the belt engage the new shell, the belt conforms to the contour of the new shell and guides the newly cut end of the web around and under the new shell to make the first lap.

Extending forwardly from upper positions on the auxiliary frames at each end of the machine are pivot bearing pads 156 (Figure 1) which pivotally mount at 157 forward arms 158 which provide bearing support for the ends of the forward shell when it is rotating on the front drum. The forward arms have pivot jaws 160 at their forward ends which support the pivot 161 of the shell when it is in the forward position.

Each forward arm has extending toward the middle of the machine a stationary upper jaw wall 162 and a spaced stationary lower jaw wall 163 best seen in Figures 1, 10, 12 and 13. Both jaw walls have tapering portions 164 which merge away from the center of the machine into the arm proper and permit the pivot end of the shell to enter the jaw and move downwardly and be received in the jaw. The forward lower jaw space has an opening 165 (Figure 13) between the forward ends of the stationary jaw portions 162 and 163, which opening is closed during the pivoting of the shell on the front drum by movable jaw closure 166 pivoting at 167 on the forward arm. On the outside edge of the forward arm a latching lever 168 is pivotally attached to the movable jaw closure 166 as by bolt 170. The latching lever 168 at its remote end carries latching roller 171 which in latching position moves into latching recess 172 of latching plate 173 secured to the back of the forward arm. A spacer 174 around bolt 170 aids in pivoting the latching lever 168.

The latching lever is urged toward the closed position of the jaw closure 166 and toward latching position by tension spring 175 acting between spring abutment 176 near the rear of the forward arm and opening 177 at the outer end of the latching lever. Pivotally connected to latching roller 171 is piston and rod combination 178 in double acting cylinder 180 (Figure 4) pivotally mounted at 181 at the bottom on a bracket from the frame.

As will be seen from Figure 23, each of the forward arm cylinders receives fluid pressure from the fluid pressure source 92 from a branch connection 182 through a solenoid valve 183 energized in parallel from the switch 184 by connections across the line 98, 100. Pipes 185 pass from the solenoid valves to the bottoms of the respective forward arm cylinders. The cylinders exhaust automatically as well known at either end when not under pressure.

Switch 184 is momentarily closed by a dog 184' (Fig. 26) which is mounted on the gate and contacts on downward movement of the knife. Dog 184' on the gate passes by and momentarily shifts the switch 184 on downward motion. It does not move the switch from normal position on upward motion of the gate as the dog is pivoted at $184^2$, and yields under the action of a tension spring $184^3$ on upward movement, but on downward movement it is held in the position shown by a stop $184^4$. The switch 184 is too stiff to be deflected to close on the upward stroke. The tops of the forward arm cylinders are actuated by fluid pressure from the fluid pressure supply 92 through a branch 186 and a solenoid valve 187 energized by switch contacts 188 which is closed by the threader arm abutment 143 mounted on lever 142 (Figures 2ª and 9) along with switch 97. A connection 190 from the outlet of the solenoid valve 187 branches in pipes 191 and 192 to the tops of the respective forward arm cylinders 180.

In lower positions of the forward arms they are limited by adjustable abutments 193 which engage the auxiliary frames.

In order to prevent the shell when wound on the rear drum from dropping into the cavity between the drums, I provide a horizontal track 194 for the pivot ends of the shell on the inside of each auxiliary frame below the loading track as best seen in Figures 4 and 5.

The operation is best seen in Figures 16 to 23 inclusive. In Figure 16 an empty shell 197 is placed on the loading track 81 with its pivot pins 161 held in elevated position by transfer arms 105 in forward position, the toggle or pusher levers extending in prolongation of the transfer arms as there is nothing to prevent the toggle lever spring 108 from pulling the toggle levers into this position. The transfer arms are held in this forward position by transfer cylinder 117. To bring the transfer arms to this forward position when starting up the machine, switch 131 is closed manually (it is usually closed by the wound roll).

At the stage of Figure 16 the threading arms 133 are in rearward position, the jaw bearings 47, 48 are up and are held up by the ratchet wheel and pawl and the gate and knife are down.

The machine operator then closes switch 127 which energizes the solenoid 126 and reverses the flow of fluid pressure through solenoid valve 121 and applies fluid pressure through pipe 124 to the top of transfer cylinder 117 to shift the transfer arms to the rear. To allow the shell pivots to drop in the lower jaw bearings 48, the handwheel is then turned to raise the upper jaw bearings, pins 53 holding the lower jaw bearings from closing. When the transfer arms reach the rear position the toggle is broken by engagement of the lower end 112 of toggle lever 106 against abutment 113, and the shell 197, having moved by by gravity down the rails 81, now becomes rear shell 198 in contact with the still closed jaw bearings as shown in Figure 17.

The movement of the pivot 161 of the rear shell 198 into the socket of the lower jaw bearing 48 at each side of the machine is shown in Figure 18.

Figure 19:
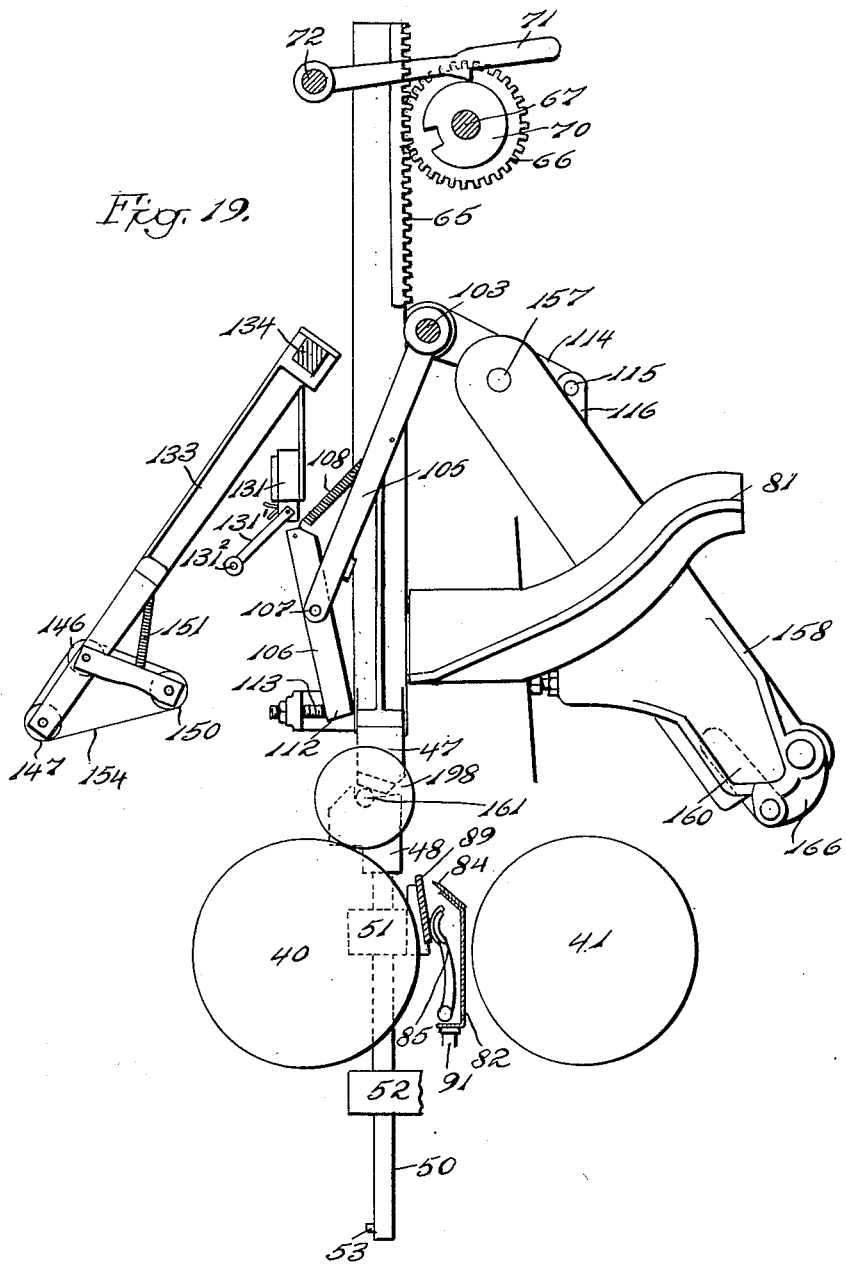

By means of the handwheel, the pawl having been released from the detent wheel, the jaw bearings 47 are lowered until the rear shell 198 contacts the rear drum 40 as shown in Figure 19. It will be understood that if there is a roll on the forward drum, the web will be moving forward between the drum 40 and the rear shell 198 in Figure 19. This has been omitted to simplify the view, and show the start of a cycle.

Assume that the web is threaded on the rear shell 198 in Figure 19 in a manner to be described. The roll continues to wind up on the rear shell until, as shown in Figure 20 a roll 200 is produced, which is large enough to close switch 131. When switch 131 closes the following results are achieved:

(1) Switch 132 (Figure 23) closes, and normally closed solenoid valve 187 is opened to apply fluid pressure to the top of forward arm cylinders 180 and move the forward arms down so that the jaw pivots on the forward arms are in position to receive the pivot pins 161 at the ends of the rear shell as it moves forward.

(2) Switch 130 closes energizing solenoid 128 and opening solenoid valve 121 to admit fluid pressure through pipe 122 to the lower end of transfer cylinder 117 which pushes the transfer arms forward. As the transfer arms move forward, the lower ends 112 of toggle levers 106 engage abutments 54 on lower jaw bearings 48 and force down the lower jaw bearings and holds them down as the transfer arms 105 swing past and the toggle levers move into position in prolongation of the transfer arms under the action of springs 108. As soon as the transfer arms and toggle lever assume the straight relationship as shown they push forward on the pivot ends 161 of the rear shell and move the rear roll 198 forward to the front drum. As the rear roll moves forward as shown in dot-and-dash lines in Figure 20, the pivot ends 161 of the rear drum 198 are supported on tracks 194 so that the roll cannot drop too far between the drums. The transfer arms continue forward until they cause the roll to engage in the forward jaw pivots, at which time the roll becomes forward roll 201 of Figure 21. A new shell is now loaded as shown in Figure 16 and brought into the rear position as shown in Figure 18. The front roll continues to wind up on the forward drum raising the forward jaw arms 158 to a position as shown in Figure 21.

When the forward roll 201 has been wound to the desired size, the operator moves the threading arms 133 forward by pulling on handle 141 and releasing pin 138 from the abutment 140. When the threaders contact the new rear shell as in Figure 21 the following actions take place:

(1) Switch 188 closes, opening solenoid valve 187 and admitting fluid pressure to the tops of forward arm cylinders 180. This tends to pull down firmly on the forward arms preparatory to cutting.

(2) Switch 97 closes and energizes the solenoid to open solenoid valve 94 and admit fluid pressure to the bottom of knife cylinder 90, raising the knife which automatically reverses and lowers as already explained. All the time downward and forward pressure is applied on the rear shell by the threaders and the tucking fingers move the forward edge of the cut web around the rear shell to be engaged by the threaders and reversed to start the new roll on the rear shell.

As the knife moves downward the dog 184' (Figures 25 and 26) on the gate closes switch 184 which opens solenoid valve 183 and admits fluid pressure to the bottom of forward arm cylinders 180 (Figure 23). The admission of fluid pressure causes the pistons and piston rods to move up and swings the latching roller 171 out of latching recess 172 on the forward arm jaws, and once the jaws are unlatched, opens the jaw closures 166. The forward roll then drops out under gravity action.

It will be understood that when switch 131 closes, one of the things that it accomplishes is applying pressure to the tops of the forward arm cylinders which again closes and latches the jaws and pulls down the forward arms before the rear shell is brought to the forward arm position.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, transfer arms swingable from a position behind the rear shell forwardly to dispose the rear shell on the front drum in the pivot jaws of the forward arms, and means responsive to the increase in diameter of the web on the rear shell for moving the transfer arms forwardly.

2. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, transfer arms swingable from a position above the rear drum to a position above the forward drum, fluid mechanism for actuating the transfer arms, and electrical means including an electric switch responding to the increase in size of the roll winding on the rear shell for actuating the fluid mechanism.

3. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, transfer arms swingable from a position above the rear drum to a position above the forward drum to move the shell forward and deposit it in the jaw bearings, pushers on the transfer arms which engage the lower jaw bearings and open the jaw bearings as the transfer arms move forward, and means for shifting the transfer arms forwardly and thereby operating the pushers and transferring the rear shell.

4. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, transfer arms pivoted above the drums and swingable from a position above the rear drum to a position above the forward drum, pushers on the transfer arms which engage the lower jaw bearing and separate the jaws when the transfer arms move forward, and means responsive to the increase in diameter of the web wound on the rear shell for actuating the transfer arms and moving them forward to deposit the rear shell on the front drum with its pivot in the pivot jaws of the forward arms.

5. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, transfer arms pivoted above the drums and swingable from a position over the rear drum to a position over the forward drum, pushers on the transfer arms which engage the lower jaw bearings when the transfer arms move forward and separate the jaw bearings, fluid means for swinging the transfer arms and pushers, and electrical means including a switch responsive to the increase in size of the web wound on the rear shell for actuating the fluid means.

6. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, transfer arms pivotally mounted above the drums and swingable from a position above the rear drum to a position above the forward drum, toggle pushers on the transfer arms adapted to engage the lower jaw bearings and open the jaws as the transfer arms move forward, spring means urging the toggle pushers toward a position in prolongation of the transfer arms, and abutments engaged by the toggle pushers in rear position and holding the toggles in broken relationship to the transfer arms.

7. In a web winder, parallel adjoining front and rear drums, means for turning the drums in the same direction, jaw bearings above the rear drum, a rear shell rotatably supported in the jaw bearings and turning with the rear drum, forward arms having pivotal jaws disposed above the front drum, transfer arms pivotally mounted above the drums and swingable from a position above the rear drum to a position above the forward drum, toggle pushers on the transfer arms adapted to engage the lower jaw bearings and open the jaws as the transfer arms move forward, spring means urging the toggle pushers toward a position in prolongation of the transfer arms, abutments engaged by the toggle pushers in rear position and holding the toggles in broken relationship to the transfer arms, fluid means for pushing the transfer arms forward, and electrical means including a switch responsive to the increase in size of the web wound on the rear shell for actuating the fluid means.

8. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, loading tracks extending rearwardly above either end of the forward drum to a position cooperating with the jaw bearings above the rear drum, transfer arms pivoted above the drums and movable from a position over the rear drum to a position over the forward drum and vice versa, means for holding the transfer arms forwardly in cooperation with the loading tracks to hold a new shell in forward position on the loading tracks, means for moving the transfer arms rearwardly, and means responsive to the increase in diameter of the web wound on the rear shell for swinging the transfer arms forwardly and transferring a shell to the forward drum.

9. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, loading tracks extending rearwardly above either end of the forward drum to a position cooperating with the jaw bearings above the rear drum, transfer arms pivoted above the drums and movable from a position over the rear drum to a position over the forward drum and vice versa, means for holding the transfer arms forwardly in cooperation with the loading tracks to hold a new shell in forward position on the loading tracks, means for moving the transfer arms rearwardly, fluid means for swinging the transfer arms forwardly, and electrical means including a switch responsive to the increase in diameter of the web wound on a rear shell for actuating the fluid means to swing the transfer arms forwardly.

10. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, loading tracks extending rearwardly above either end of the forward drum to a position cooperating with the jaw bearings above the rear drum, transfer arms pivoted above the drums and movable from a position over the rear drum to a position over the forward drum and vice versa, means for holding the transfer arms forwardly in cooperation with the loading tracks to hold a new shell in forward position on the loading tracks, means for moving the transfer arms rearwardly, pushers on the transfer arms for forcing down on the lower jaw bearings and opening the jaw bearings when the transfer arms move forwardly, and means for automatically forcing the transfer arms forwardly when the web wound on the lower shell reaches a predetermined diameter.

11. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, loading tracks extending rearwardly above either end of the forward drum to a position cooperating with the jaw bearings above the rear drum, transfer arms pivoted above the drums and movable from a position over the rear drum to a position over the forward drum and vice versa, means for holding the transfer arms forwardly in cooperation with the loading tracks to hold a new shell in forward position on the loading tracks, means for moving the transfer arms rearwardly, toggle pushers pivotally mounted on the ends of the transfer arms and in forward motion of the transfer arms engaging and depressing the lower jaw bearings and opening the jaw bearings, springs urging the pushers toward the position in prolongation of the transfer arms, abutments engaged by the toggle pushers in rear position of the transfer arms to break the toggles, and automatic means responsive to the increase in diameter of the web wound on the rear shell for moving the transfer arms and toggle pushers forwardly.

12. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, loading tracks extending rearwardly above either end of the forward drum to a position cooperating with the jaw bearings above the rear drum, transfer arms pivoted above the drums and movable from a position over the rear drum to a position over the forward drum and vice versa, means for holding the transfer arms forwardly in cooperation with the loading tracks to hold a new shell in forward position on the loading tracks, means for moving the transfer arms rearwardly, threading arms pivotally mounted above the rear shell, and threading belts rotatably mounted on the threading arms and adapted to move forward with the threading arms to engage a rear shell.

13. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, loading tracks extending rearwardly above either end of the forward drum to a position cooperating with the jaw bearings above the rear drum, transfer arms pivoted above the drums and movable from a position over the rear drum to a position over the forward drum and vice versa, means for holding the transfer arms forwardly in cooperation with the loading tracks to hold a new shell in forward position on the loading tracks, means for moving the transfer arms rearwardly, threading arms pivotally supported above the rear drum, belt threaders on the threading arms, a knife movable vertically between the drums to cut the web, an electric switch closed by forward motion of the threading arms, means actuated by the electric switch for raising the knife, and means responsive to increase in size of a rear shell on the rear drum for moving the transfer arms forwardly.

14. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, loading tracks extending rearwardly above either end of the forward drum to a position cooperating with the jaw bearings above the rear drum, transfer arms pivoted above the drums and movable from a position over the rear drum to a position over the forward drum and vice versa, means for holding the transfer arms forwardly in cooperation with the loading tracks to hold a new shell in forward position on the loading tracks, means for moving the transfer arms rearwardly, threading arms pivotally mounted above the rear drum for threading belts on the threading arms, a knife movable to a position between the drums to cut the web, means responsive to the forward movement of the threading arms for pulling down on the forward arms and concurrently raising the knife, and means responsive to the increase in size of the web wound on a shell on the rear drum for moving the transfer arms forwardly.

15. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, loading tracks extending rearwardly above either end of the forward drum to a position cooperating with the jaw bearings above the rear drum, transfer arms pivoted above the drums and movable from a position over the rear drum to a position over the forward drum and vice versa, means for holding the transfer arms forwardly in cooperation with the loading tracks to hold a new shell in forward position on the loading tracks, means for moving the transfer arms rearwardly, fluid means for urging the forward arms into lower position to receive a shell on the forward drum, fluid means for swinging the transfer arms forwardly, and means including an electric switch responsive to the increase in diameter of the web wound on the rear drum for actuating the fluid means to pull down on the forward arms and to move the transfer arms forwardly.

16. In a web winder, parallel adjoining front and rear drums, means for turning the drums in the same direction, jaw bearings above the rear drum, a rear shell rotatably supported in the jaw bearings and turning with the rear drum, forward arms having pivot jaws disposed above the front drum, loading tracks extending rearwardly above either end of the forward drum to a position cooperating with the jaw bearings above the rear drum, transfer arms pivoted above the drums and movable from a position over the rear drum to a position over the forward drum and vice versa, means for holding the transfer arms forwardly in cooperation with the loading tracks to hold a new shell in forward position on the loading tracks, means for moving the transfer arms rearwardly, fluid means for urging the forward arms into lower position to receive a shell on the forward drum, fluid means for swinging the transfer arms forwardly, means including an electric switch responsive to the increase in diameter of the web wound on the rear drum for actuating the fluid means to pull down on the forward arms and to move the transfer arms forwardly, and means on the transfer arms for separating the jaw bearings as the transfer arms move forward.

WALTER E. AULEN.

REFERENCES CITED

The following references are of record in the file of this patent:

UNITED STATES PATENTS

| Number | Name | Date |
| --- | --- | --- |
| 1,770,162 | Lamoureux | July 8, 1930 |
| 2,355,318 | Moravek | Aug. 8, 1944 |
| 2,537,588 | Husson | Jan. 9, 1951 |